United States Patent

[11] 3,608,973

[72] Inventor Thomas A. Klyee
 Memphis, Tenn.
[21] Appl. No. 795,210
[22] Filed Jan. 30, 1969
[45] Patented Sept. 28, 1971
[73] Assignee Ranger Tool Co.
 Ellendale, Tenn.

[54] SAUSAGE CASING DISCHARGE MEANS FOR LINK-SAUSAGE-PEELING APPARATUS
 8 Claims, 5 Drawing Figs.

[52] U.S. Cl. .................................... 302/2,
 302/59
[51] Int. Cl. ..................................... B65g 53/00
[50] Field of Search............................ 302/2, 21,
 22, 23, 28, 49, 59; 19/155, 156.4; 17/1

[56] References Cited
 UNITED STATES PATENTS
 1,346,550 7/1920 Martin.......................... 19/156.4
 1,971,421 8/1934 Mackenzie ................... 302/59
 2,023,273 12/1935 Leguillon ...................... 19/155

Primary Examiner—Andres H. Nielsen
Attorney—John R. Walker, III

ABSTRACT: For use in sausage-peeling apparatus utilizing suction air pneumatic tube means for conveying meat-free casings of the sausages. The disclosed structure includes a vacuum wheel discharge unit adapted to be interposedly arranged in the pneumatic tube means of the sausage peeling apparatus for removing the sausage casing elements from the pneumatic tube while yet maintaining suction in the tube. The vacuum wheel casing discharge unit includes a cuplike power-driven vacuum wheel having a generally cylindrical perforated rim. Air under negative pressure is caused to flow radially inwardly into the hollow interior of the wheel and axially outwardly away from the wheel through the open side thereof; the sausage casing elements are sucked against the outside of the wheel by vacuum and are moved in an arc configuration to a position of no vacuum and discharged at atmospheric pressure. The casing discharge unit includes also vacuum seal means including a vacuum gate member for assisting in maintaining vacuum pressure in the interior of the casing discharge unit.

INVENTOR.
THOMAS A. KLYCE
BY John R. Walker, III
Attorney

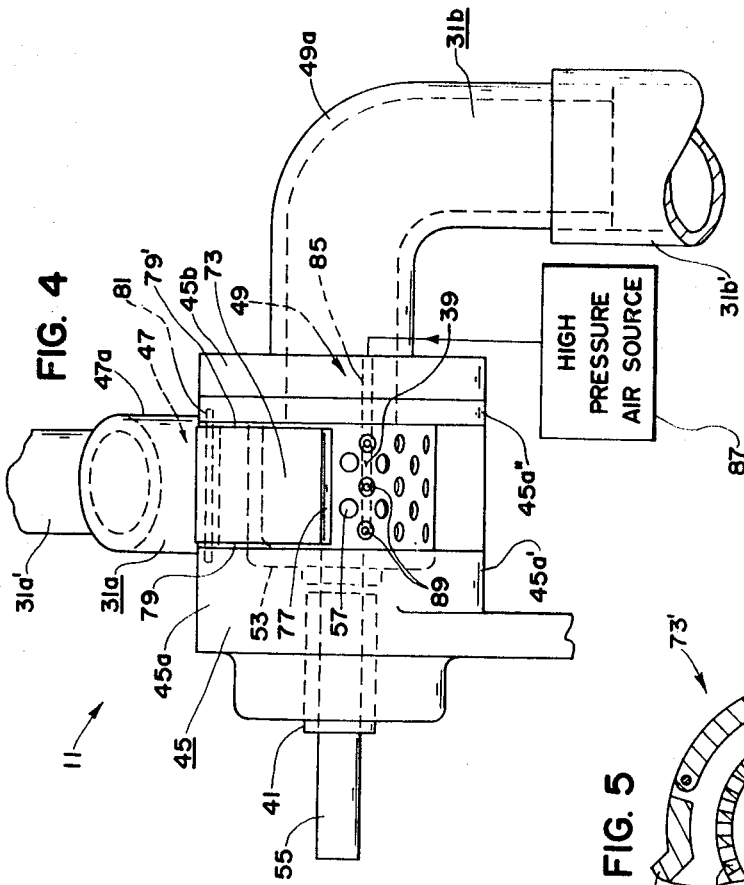
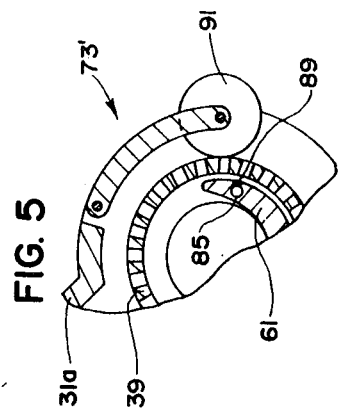
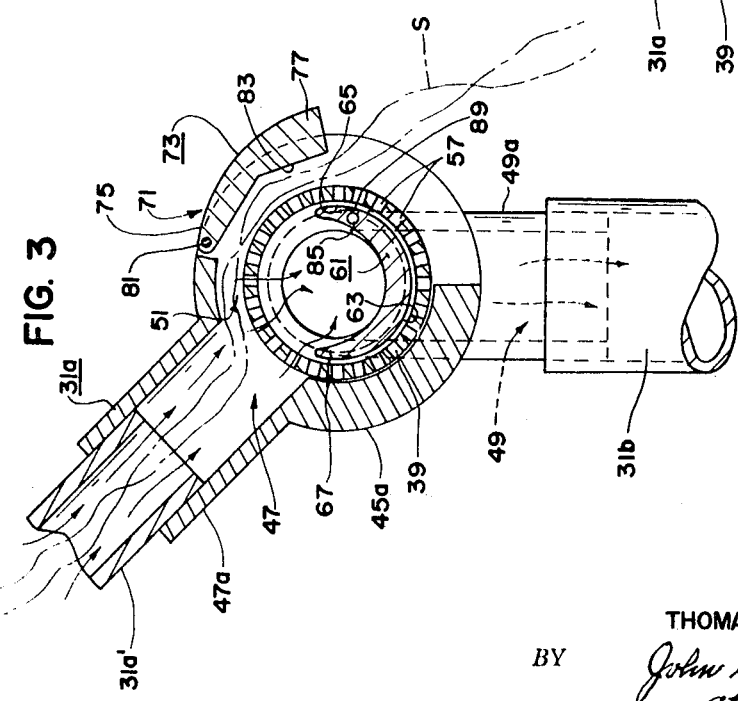

3,608,973

SAUSAGE CASING DISCHARGE MEANS FOR LINK-SAUSAGE-PEELING APPARATUS

BACKGROUND OF THE INVENTION

1. Field of the Invention

The invention relates generally to discharge or pneumatic valve type devices adapted for removing vacuum-tube-conveyed material from a vacuum tube without causing loss of vacuum air from the tube. The vacuum wheel discharge unit of the present invention is particularly directed toward removal of meat-free linked sausage casing elements from a suction air type conveying conduit. The invention is an improvement on the invention disclosed in U.S. Pat No. 3,312,995 assigned to the same assignee as the invention of this disclosure.

2. Description of the Prior Art

In the vacuum wheel-type arrangement is utilized for stripping the sausage casings from the sausage meat kernels and conducting the sausage casings through a suction air conveying tube into a container for containing the waste casing elements. The vacuum tube conveying means of U.S. Pat. No. 3,312,995 functions quite readily for removing sausage casings from a single sausage-skinning machine. However such suction tube conveying means as disclosed in U.S. Pat. No. 3,312,995 may not function efficiently in a sausage-processing establishment utilizing simultaneously a plurality of sausage-skinning machines feeding the casings into containers having a common source of vacuum. It may well be appreciated that in a sausage-processing plant utilizing a plurality of sausage-peeling heads or machines, it will be desirable to catch and contain the waste casing elements issuing from each machine and for economic reasons it is is use a common vacuum source. Also, it is desirable to maintain substantially uniform negative pressures at the sausage-peeling machines are simultaneously being operated. However, when it is necessary to shut down one of the machines, this changes the negative pressure at the other machines, and it usually is necessary to shut down the whole system. The principle of operation of the waste product removal means of Pat. No. 3,312,995, through suited for a single sausage-skinning machine operation, is not particularly suited for removing the waste causing products from a plurality of simultaneously operative sausage-skinning machines which are fed into a single container having a single vacuum source. U.S. Pat. Nos. 521,159 and 2,489,025 illustrate other forms of discharge units or units adapted for removing a pneumatically conveyed product form conveying conduits without loss of air. Such pneumatic valve or air lock means as shown in these patents are generally directed toward other conveyed products in nonanalogous arts with problems which are different form those of the preset invention.

SUMMARY OF THE INVENTION

The present invention is particularly directed towards the removal of a continuous string of meat-free linked sausage casing elements from a suction airtight conveying conduit, and is particularly suited for removing the waste casing products from a plurality of simultaneously operative sausage-skinning machines which are fed into a single container having a single vacuum source.

The present invention utilizes a radially inward flow of air through a cup-shaped power-driven vacuum wheel. The sausage casing elements are sucked against the outside of the wheel by vacuum and are moved in an arced configuration to a position of no vacuum and discharged to the outside atmosphere. The casing discharge unit also includes a vacuum seal means including a vacuum gate member for assisting in maintaining vacuum pressure in the interior of the casing discharge unit. The vacuum seal discharge unit is of such design to permit discharged of the conveyed material without restricting unduly the flow of air through the pneumatic tube or without unduly reducing the velocity of the air in the tube.

BRIEF DESCRIPTION OF THE DRAWING

FIG. 3 is a vertical plane transverse sectional view taken as on the line III—III of FIG. 2.

FIG. 4 is a rear elevational view of the discharge unit as viewed from the left of FIG. 1.

FIG. 5 is a fragmentary view similar to a portion of that shown in FIG. 3 and showing a modification of the vacuum seal means.

DESCRIPTION OF THE PREFERRED EMBODIMENT

Figure 1:
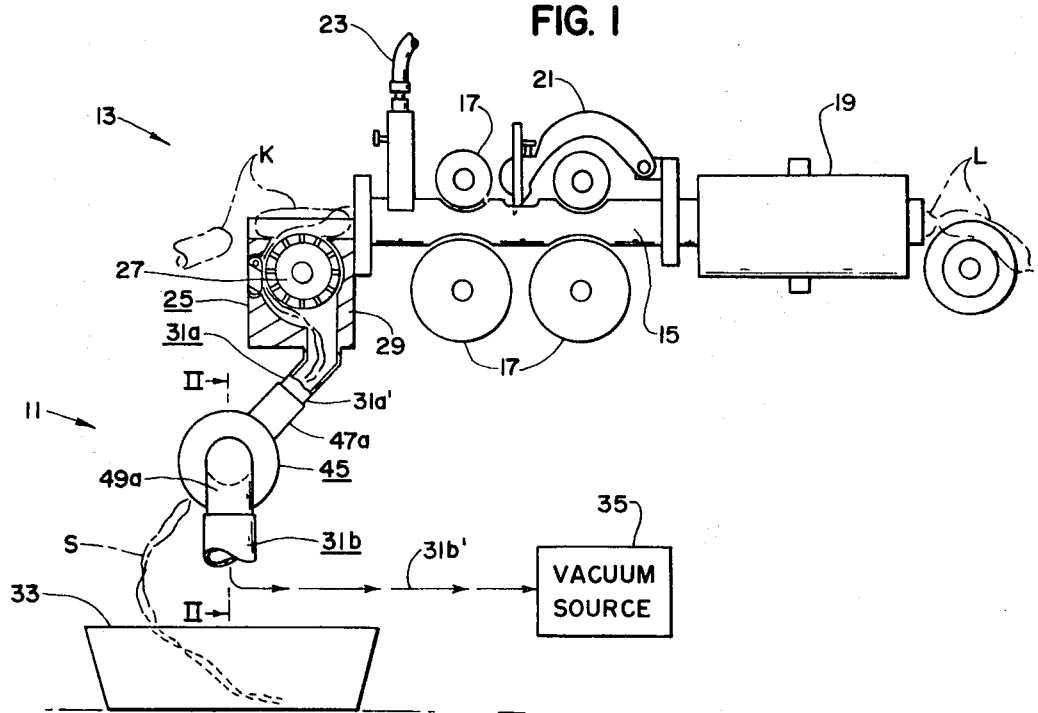
FIG. 1 is a side elevational view of the sausage casing discharge unit of the present invention shown in an environmental arrangement with a sausage-skinning apparatus.

The sausage casing discharge unit of the present invention is indicated by numeral 11 and is described as being operative in a linked sausage-peeling apparatus 13. The sausage-peeling apparatus may include trackway and feed roller structure 15, 17 adapted for moving a chain of sausage links L along the trackway; a steam-heated oven 19 for heating the sausages as they are moved along trackway structure 15; pivotally mounted blade means 21 adapted for slitting the sausage casings; compressed air means 23 adapted for loosening the slit skin casings from meat kernels K of sausage links L; and air suction means for separating string of meat-free casings S from the meat kernels K including a casting stripping units 25 having a suction wheel 27 and suction wheel housing 29, and including conveyor conduit means 31a, 31b arranged respectively upstream and downstream from the discharge unit 11 of the present invention, a container 33 adapted for containing casings S, and suction pump or vacuum source means 35.

In operation of the sausage-peeling apparatus, vacuumed air is drawn downwardly through vacuum wheel 27, through upstream conduit section 31a through casing discharge unit 11, through downstream conduit section 31b into and though vacuum source 35. A string of meat-free casing elements S are drawn downwardly, around the rearward side of vacuum wheel 27, through upstream conduit section 31a through discharged unit 11 and into container 33. Although not shown, it may be desirable in certain installations, to dispense with air suction wheel 27 and housing means 29 and to utilize discharge unit 11 instead. Thus, in certain sausage-peeling apparatus it may be desirable to utilize a similar unit to discharge unit 11 for downwardly stripping the slit sausage casings from around meat kernels K and in such an installation, only one vacuum wheel is utilized for each sausage-peeling machine. However, for purposes of clarity in description, the inventive structure will be described as being incorporated in a casing discharge unit (11) considered as being interposedly fitted in pneumatic conduit means (31a, 31b).

The sausage casing discharge unit 11 is somewhat similar to the casing-stripping unit 25 and includes a vacuum wheel 37 having a cylindrical perforated rim portion 39; bearing means 41 rotatingly journaling wheel 37 on a horizontal axis; drive means 43, schematically illustrated, driving wheel 37; housing structure 45 arranged around wheel 37 having structure defining an intake opening 47, an exhaust opening 49, and a sausage-casing passageway 51. For purposes of description, housing structure 45 will be considered as being substantially of two-part construction including a generally cylindrical sleevelike housing body part 45a and a generally annular-shaped end part 45 b.

Bearing means 41 preferably is arranged on one side only of vacuum wheel 37 for permitting ready passage of air into and out of the interior of the wheel; the cantilever journaling of vacuum wheel 37 permits ready downward flow of vacuumed air into the interior of the wheel through intake opening 47 and outwardly though exhaust opening 49. Vacuum wheel 37 is generally cup-shaped and includes a disklike hub portion 53 fixedly mounted on a short shaft 55 which in turn is journaled in bearing structure 41. Thin-walled rim portion 39 of wheel 37 is provided with a multiplicity of radially opening apertures 57 intermittently spaced about the wheel rim circumference. Conveyor conduit structures 31a, 31b may include respectively flexible tubing conduit sections 31a', 31b' with upstream tubing section 31a' interconnected casing stripping unit 25 and intake structure 47a of discharge unit 11, and with tubing section 31b' extending downwardly form housing exhaust structure 49a and communicating with vacuum source 35.

Figure 2:
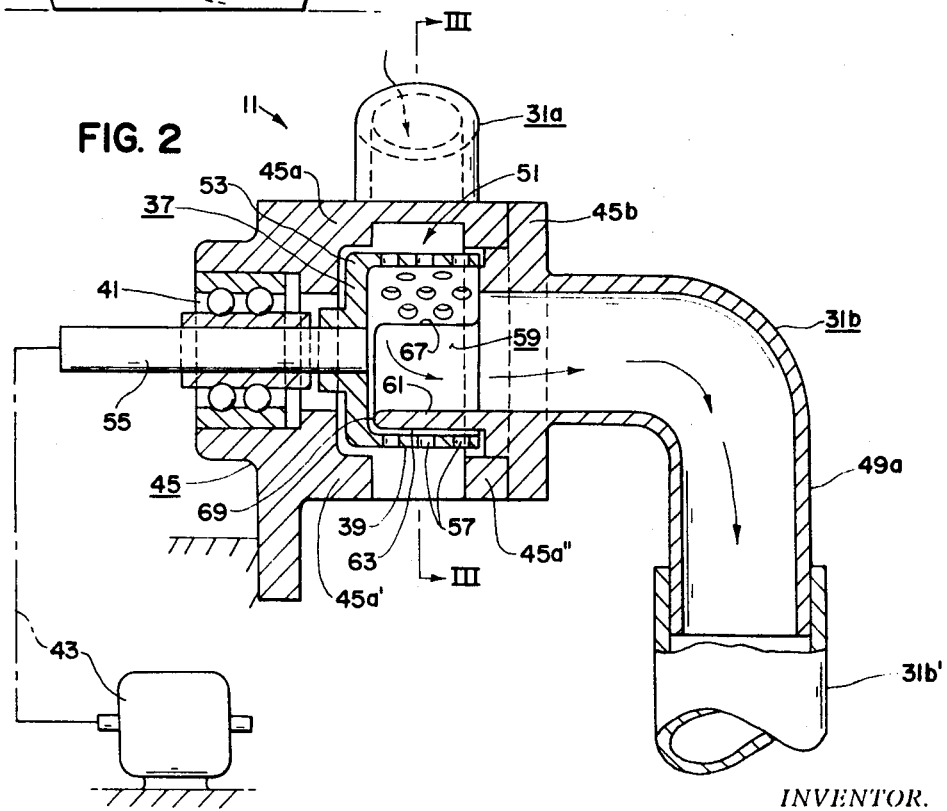
FIG. 2 is an enlarged vertical plane longitudinal sectional view of the sausage casing discharge unit taken as on the line II—II of FIG. 1.

Sausage casing discharge unit 11 includes inside blocking or seal means 59 arranged in the lower interior of wheel 37 and operative for occluding passage of air through perforations 57 in a portion of wheel rim 39. Inside seal means 59 includes preferably a crescent-shaped projection 61 integrally formed with housing end part 45b and projecting axially inwardly from the housing and into the interior of wheel 37. Crescent-sectioned projection 61 includes an arcuate outer surface 63 configured for fitting in close proximity with the inner cylindrical surface structure of vacuum wheel rim 39. Crescent-shaped projection 61 preferably extends substantially semicircularly around the interior of vacuum wheel 37 and includes a leading edge portion 65 and trailing edge portion 67 generally diametrically spaced apart within the interior of the vacuum wheel. Curved outer surface 63 and end surface 69 of projection 61 preferably are spaced in very close proximity respectively with wheel rim 39 and wheel hub 53 (see FIG. 2). Trailing edge portion 67 of projection 61 preferably is terminated at a disposition slightly below intake opening 47 and projection 61 is of such configuration as not to obstruct or restrict the free passage of vacuum air through wheel rim 39 into the wheel interior.

Casing discharge unit 11 includes outside seal means 71 preferably including a vacuum gate member 73 generally superjacently arranged over vacuum wheel rim 39. Vacuum gate member 73 generally is flattened rectangular tonguelike in form, having forward and rearward edge portions 75, 77 a', 45a'' oppositely facing flat side surfaces 79, 79'. Sausage-casing passageway 51 is defined in part by opposingly arranged semicircular rib portions 45a', 45a'' integrally formed respectively with housing body 45a. Vacuum gate member 73 is movably secured in casing passageway 51 with opposite side surfaces 79, 79' closely spaced from housing structure rib portions 45a', 45a''. Pin means 81 extending respectively through vacuum gate leading edge portion 75 and rib portions 45a', 45a'' of housing structure 45a pivotally secures gate member 73 in casing passageway 51. Vacuum gate member 73 is freely but snugly fitted in casing passageway 51 and trailing edge portion 77 thereof is adapted for pivotal movement toward and away from vacuum wheel rim 39 as sausage-casing string S passes between the gate member and the vacuum wheel rim. Vacuum gate member 73 provides automatically variable seal means for maintaining vacuum in housing structure 45 and wheel 37.

When discharged unit 11 is operative, the passage of sausage-casing string elements S between gate member 73 and vacuum wheel 37 causes the gate member to pivotally rise and fall and automatically compensate for varying thicknesses of the sausage casing being discharged from under the gate member and into container 33. With reference to FIG. 3, it will be noted that trailing edge portion 77 of vacuum gate member 73 is arranged substantially directly radially opposite leading edge portion 65 of crescent-shaped projection 61; trailing edge 77 of vacuum gate member 73, arranged externally of vacuum wheel rim 39, is adapted for coactingly operative action with leading edge portion 65 of projection 61, arranged internally of vacuum wheel rim 39. When vacuum gate member trailing edge 77 is in engagement with vacuum wheel rim 39, coaction respectively between the trailing and leading edge portions 77, 65 respectively of gate member 73 and projection 61 defines vacuum seal means for preventing loss of vacuum through casing passageway 51.

In operation of casing discharge unit 11 sausage-casing elements S are drawn by vacuum downwardly through upstream conduit section 31a and against the upper outer periphery of vacuum wheel rim 39 (see FIG. 3). The clockwise driven wheel 37 (as viewed in FIG. 3) mechanically moves the sausage-casing elements S in an arced path underneath vacuum gate 73. As the sausage-casing elements S pass underneath gate member 73 and into the atmosphere, the casing elements are released by movement of vacuum wheel rim portions passing over crescent projection leading edge portion 65; as a portion of vacuum wheel rim 39 passes by crescent projection leading edge 65, the wheel rim apertures 57 are occluded, thus releasing the suction action on sausage-casing string S and permitting the sausage string to drop into container 33.

In operation of sausage discharge unit 11, vacuum action on undersurface 83 of vacuum gate member 73 causes the gate member to be pivotally urged against the sausage-casing elements or against the outer periphery of wheel rim 39. Since there is no vacuum action on undersurface 83 of vacuum gate 73 when the apparatus is inoperative, it is desirable that the vacuum gate member be pivotally moved radially inwardly relative to vacuum wheel 37 when the sausage-skinning apparatus is inoperative or idle. Although mechanical spring means or other such resilient structure may be utilized for pivotally urging the vacuum gate toward the vacuum wheel, a simple practical way for accomplishing this is by utilizing the force of gravity: Gate member 73 preferably is arranged substantially entirely above a horizontal plane lying coincident with the axis of vacuum wheel 37 and with the gate member being pivotally secured in such a manner that gravity constantly causes the gate to be urged toward the wheel rim. The weight of vacuum gate 73 in conjunction with the vacuum action on the undersurface of the gate member causes it to be pivotally urged inwardly against the wheel rim or against the sausage-casing string as it passes through passageway 51 and into the atmosphere.

There is preferably provided air jet means for insuring that the sausage casings do not continue to adhere to wheel 37 beyond the point that they should. In other words, air jet means is provided to insure that the casings go out to the right as viewed in FIG. 3 and not downward through the exhaust opening 49. Thus, there is preferably provided a transverse bore 85 extending through projection 61 to which is connected high pressure air as from a source 87. A plurality of apertures 89 in projection 61 in spaced-apart relationship along bore 85 lead from the bore downwardly and to the right as viewed in FIG. 3 through projection 61 and directed the air though the apertures 57. The apertures 89 are preferably adapted to align with the apertures 57 as the apertures 57 are moved with the rotation of wheel 37 past the apertures 89 whereby the casing will be blown outwardly away from wheel 37.

Referring now to FIG. 5, there is shown an alternate construction of the vacuum seal means, wherein it will be seen that in place of the gate member 73 utilizing its undersurface to contract the sausage casings, the modifications gage 73' is provided with a wheel 91 rotatably mounted at the lower end of the gate member so that the wheel 91 is adapted to rollingly contact the sausage casings to form the seal.

I claim:

1. Means for discharging sausage casings or the like comprising a hollow vacuum wheel, having perforations therethrough, means rotatably driving said wheel, housing structure arranged about said wheel defining an intake opening adjacent the exterior of said wheel through which the casings or the like are adapted to gain entrance to the exterior of the wheel, exhaust means leading from the interior of said wheel to a vacuum source for causing air to flow through said intake opening and through said wheel to the interior thereof to cause the casings to adhere at least to a portion of the exterior of said wheel, said housing structure being open to the outside atmosphere along a part thereof adjacent a portion of said wheel to define an exit opening spaced circumferentially of said wheel from said entrance opening and through which the casing is adapted to pass to the outside atmosphere; and outside seal means including gate means for contacting the outside of the sausage casings just before the exiting thereof into the outside atmosphere.

2. The apparatus of claim 1, in which said gate means includes a pivoted gate member having roller means mounted thereon for rollingly engaging the sausage casings.

3. In apparatus for peeling link sausages or the like having pneumatic conduit means for conveying the meat-free sausage casing, sausage casing discharged means interposedly arranged in said pneumatic conduit means for discharging the sausage casings from said conduit means while maintaining vacuum in said conduit means comprising a hollow vacuum wheel having a multiplicity of perforations, bearing means rotatively supporting said wheel on its axis, means for driving said wheel unidirectionally, housing structure arranged about said wheel defining intake and exhaust openings communicating said wheel respectively with upstream and downstream sections of said conveying conduit relative to said vacuum wheel, said intake opening being oriented generally radially outwardly relative to said wheel rim and arranged for causing flow of the casing elements against the outside of the rim and flow of air though the rim into the hollow interior of the wheel, said exhaust opening being oriented generally axially outwardly relative to said wheel substantially sealingly communicating the hollow interior of said wheel with the downstream section of the conveyor conduit means, said housing structure defining also a sausage-casing passageway defined in part by the outer periphery of said wheel rim, and with said passageway communicating with said intake opening and extending therefrom in the direction of rotation of said wheel along the periphery of said wheel rim and opening into the atmosphere, inside seal means arranged in the interior of said wheel at least along a circumferential section of said wheel rim for occluding passage of air through the perforations of said wheel rim along said wheel section, said inside seal means including leading edge structure arranged substantially directly inwardly from the downstream terminus of said casing passageway.

4. The means for discharging sausage casings as defined in claim 3, wherein said vacuum wheel is generally cup-shaped and having a thin-walled multiperforated cylindrical rim, and wherein said bearing means rotatingly supporting said vacuum wheel is arranged on one side only of said wheel, and wherein said vacuumed air flows through said intake openings, through the perforated rim of the wheel into the wheel interior, and out of the wheel interior axially of said wheel and substantially on that side only of said wheel opposite from said bearing means.

5. The means for discharging sausage casings as defined in claim 4, wherein said inside seal means arranged in the interior of said vacuum wheel is generally in the form of a crescent-shaped projection projecting axially inwardly from the open side of said wheel and with said projection having a plain curve configured outer surface corresponding substantially in radii proportions with the inner cylindrical surface structure of the rim of said vacuum wheel, and wherein said crescent-shaped projection is supported with said outer surface arranged in close and corresponding proximity to the inner cylindrical surface structure of said vacuum wheel rim.

6. The means for discharging sausage casings as defined in claim 3, which additionally includes outside seal means arranged externally of said wheel rim including a gate member generally superjacently arranged relative to said vacuum wheel rim and snugly but freely received in said casing passageway, said gate member being secured at the leading edge portion thereof at a place adjacent said intake opening, said gate member being movable inwardly and outwardly relative to said wheel rim and including a trailing edge portion arranged substantially directly radially outwardly of the leading edge structure of said inside seal means; the leading edge structure of said inside seal means and the trailing edge structure of said gate member of said outside seal means being coactingly operative respectively on opposite sides of said wheel rim and defining vacuum seal elements for maintaining vacuum in said vacuum wheel means while permitting passage of sausage casing elements.

7. The means for discharging sausage casings as defined in claim 6, wherein said sausage-casing passageway is defined in part by opposingly arranged housing rib structures arranged substantially on opposite sides of said vacuum wheel and defining conformingly facing side surfaces, and wherein said gate member is generally flattened tonguelike in form and having oppositely facing side surfaces, and wherein said outside seal means includes means pivotally supporting said gate member at its leading edge structure at a disposition substantially between said opposingly arranged housing rib structures and with the oppositely facing side surfaces of said gate member being correspondingly closely spaced respectively from the confrontingly facing side surfaces of said housing rib structures.

8. The means for discharging sausage casings as defined in claim 7, wherein said vacuum wheel is journaled on a horizontal axis and wherein said gate member is arranged substantially entirely above a horizontal plane lying coincident with the axis of said wheel, and further with the relative arrangement of said wheel and said gate member, and the pivot axis of the gate member being such as to utilize at least in part the force of gravity in urging the gate member toward the vacuum wheel rim.